United States Patent
Campbell

Patent Number: 6,133,957
Date of Patent: Oct. 17, 2000

[54] ADAPTIVE DIAGONAL INTERPOLATION FOR IMAGE RESOLUTION ENHANCEMENT

[75] Inventor: Jack J. Campbell, San Francisco, Calif.

[73] Assignee: Faroudja Laboratories, Inc., Sunnyvale, Calif.

[21] Appl. No.: 08/953,840

[22] Filed: Oct. 14, 1997

[51] Int. Cl.[7] .............................. H04N 7/01; H04N 11/20; H04N 9/78

[52] U.S. Cl. .......................... 348/458; 348/459; 348/448; 348/441; 348/699

[58] Field of Search .................................. 348/458, 459, 348/448, 441, 443, 446, 447, 699; 382/254, 299, 300; H04N 2/01, 11/20, 9/78

[56] References Cited

U.S. PATENT DOCUMENTS

| | | |
|---|---|---|
| 4,985,764 | 1/1991 | Sato . |
| 5,001,563 | 3/1991 | Doyle et al. . |
| 5,010,401 | 4/1991 | Murakami et al. ...................... 348/398 |
| 5,093,721 | 3/1992 | Rabii . |
| 5,347,599 | 9/1994 | Yamashita et al. . |
| 5,532,751 | 7/1996 | Lui . |
| 5,579,418 | 11/1996 | Williams et al. . |
| 5,742,348 | 4/1998 | Kuwahara et al. . |
| 5,929,913 | 7/1999 | Etoh ........................................ 348/398 |
| 5,995,154 | 11/1999 | Heimburger ............................ 348/448 |

FOREIGN PATENT DOCUMENTS

| | | |
|---|---|---|
| 0192292 | 8/1986 | European Pat. Off. . |
| 9717801 | 5/1997 | WIPO . |

OTHER PUBLICATIONS

Doyle, et al., "Progressive Scan Conversion Using Edge Information," Signal Processing of HDTV, Elsevier Science Publishers B. V., 1990, pp. 711–721.

Middelhoek, "Transformational Design of a Direction Detector for the Progressive Scan Conversion Processor," University of Twente, Enshede, The Netherlands, Dec. 1, 1994, chapters 1 and 2.

*Primary Examiner*—Nathan Flynn
*Assistant Examiner*—Vivek Srivastava
*Attorney, Agent, or Firm*—Gallagher & Lathrop; David N. Lathrop

[57] ABSTRACT

A method or device for increasing the resolution of an image generates additional pixels in the image using interpolation. Various tests are performed for each additional pixel to determine whether conditions render the interpolation direction ambiguous or uncertain. In a television image, for example, an interpolation direction is derived for each additional pixel from a weighted combination of a vertical direction and a best-choice diagonal direction. If a potential interpolation condition cannot be determined with a high level of confidence, the weighted combination favors the vertical direction.

38 Claims, 5 Drawing Sheets

FIG.6c

ADAPTIVE DIAGONAL INTERPOLATION FOR IMAGE RESOLUTION ENHANCEMENT

TECHNICAL FIELD

The present invention relates to methods and devices for increasing the resolution of an image by generating additional pixels in the image using interpolation. In particular, for images such as television or other video pictures, the present invention relates to generating additional pixels in the image by using an adaptive technique that determines whether interpolation should be done vertically or diagonally.

BACKGROUND ART

One way in which the resolution of a television picture can be increased is to convert an interlaced image into a progressive-scanned image. According to one technique disclosed in European patent application EP-A 0 192 292, this conversion is accomplished by examining pixels in three consecutive picture lines in consecutive first and second fields of the interlaced image signal, selecting a pair of pixels (P,Q), one pixel from each of two different lines in the second field, that most resemble one another, evaluating these two pixels and a third pixel (D) taken from the third line in the first field to find the median Y', and using this median to generate a new pixel Y in the second field. The technique works reasonably well for some images but generates artifacts such as a serration of sloping contours that move from frame to frame.

One attempt to solve this problem is disclosed in U.S Pat. No. 5,001,563. According to the technique disclosed therein, the median Y' is compared with the pixel D and, if the two values differ by more that some threshold amount, new pixel Y is formed from an average of the two pixels (P,Q). In one variation of this technique, new pixel Y is formed from a weighted sum of this average and the pixel (D). In yet another variation, if the best mutual resemblance of a pair of pixels is only slightly better than the worst mutual resemblance of another pair of pixels, then the pair of pixels that are vertically oriented with respect to the location for pixel Y are chosen as pixels (P,Q). Unfortunately, this technique generates objectionable artifacts in pictures where two or more pairs of pixels have high mutual resemblance.

Another interlaced-to-progressive-scan image conversion technique is disclosed in U.S. Pat. No. 5,532,751. According to this technique, variation between pixels in an image are evaluated to detect edges or contours. If the variation between pixels is below a threshold, the orientation of edge is deemed to have been successfully estimated and a new pixel is formed from the average of pixels lying along the estimated orientation. If the estimate of edge orientation is deemed to be unsuccessful, a new pixel is formed from the average of two vertically aligned pixels. This technique also generates objectionable artifacts in pictures having two or more pairs of pixels with high mutual resemblance.

DISCLOSURE OF INVENTION

It is an object of the present invention to improve the quality of images resulting from resolution enhancement.

According to the teachings of the present invention in one embodiment, an additional pixel is generated at a location in an image comprising pixels arranged in rows by generating a plurality of measurement signals representing respective directions and respective measures of variance between pairs of sets of pixels in the respective directions relative to the location, evaluating respective directions represented by the measurement signals to identify the two best directions for interpolation and selecting therefrom a single best choice direction for interpolation, evaluating the two best directions and, in response thereto, generating a first control signal indicating a measure of ambiguity for interpolation about the location along the single best choice direction, generating a direction control signal representing a weighted combination of the single best choice direction and another direction that is substantially orthogonal to the rows, the weighted combination formed according to the first control signal, and generating the additional pixel by interpolating pixels in the image along a direction represented by the direction control signal.

In another embodiment, a second control signal is generated indicating a measure of confidence in the single best choice direction and the weighted combination is formed according to the first control signal and the second control signal.

The various features of the present invention and its preferred embodiments may be better understood by referring to the following discussion and the accompanying drawings in which like reference numerals refer to like elements in the several figures. The contents of the discussion and the drawings are set forth as examples only and should not be understood to represent limitations upon the scope of the present invention.

MODES FOR CARRYING OUT THE INVENTION

A. Overview of Method

Figure 1:
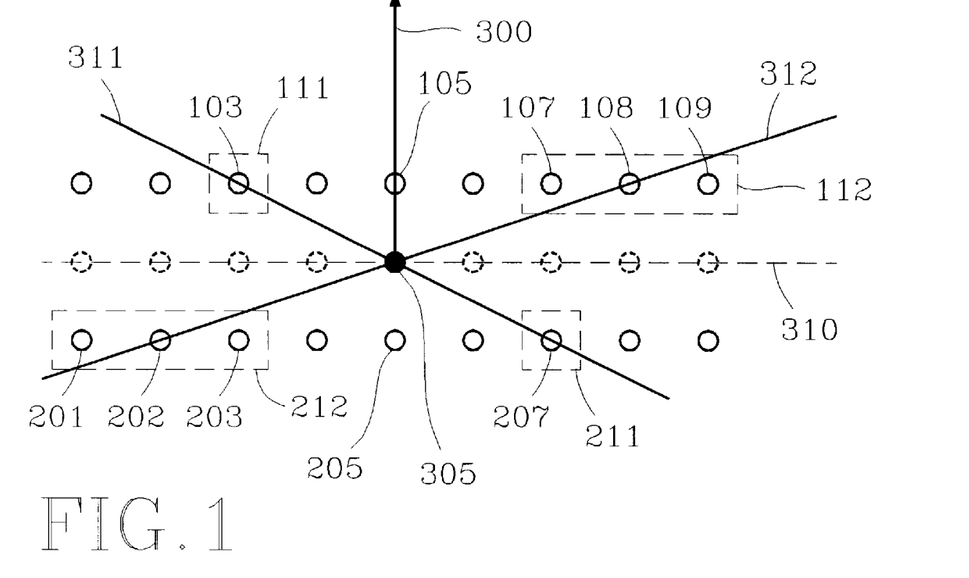
FIG. 1 is a hypothetical schematic representation of a portion of an image comprising pixels arranged in rows.

FIG. 1 illustrates a portion of an image comprising pixels arranged in rows. Pixels 103, 105 and 107 through 109 are arranged in one row of the image and pixels 210 through 203, 205 and 207 are arranged in another row of the image. In the example illustrated, the resolution of the image is to be enhanced by generating additional pixels between the two rows of pixels. The figure and following discussion describe the generation of additional pixel 305.

Figure 2:
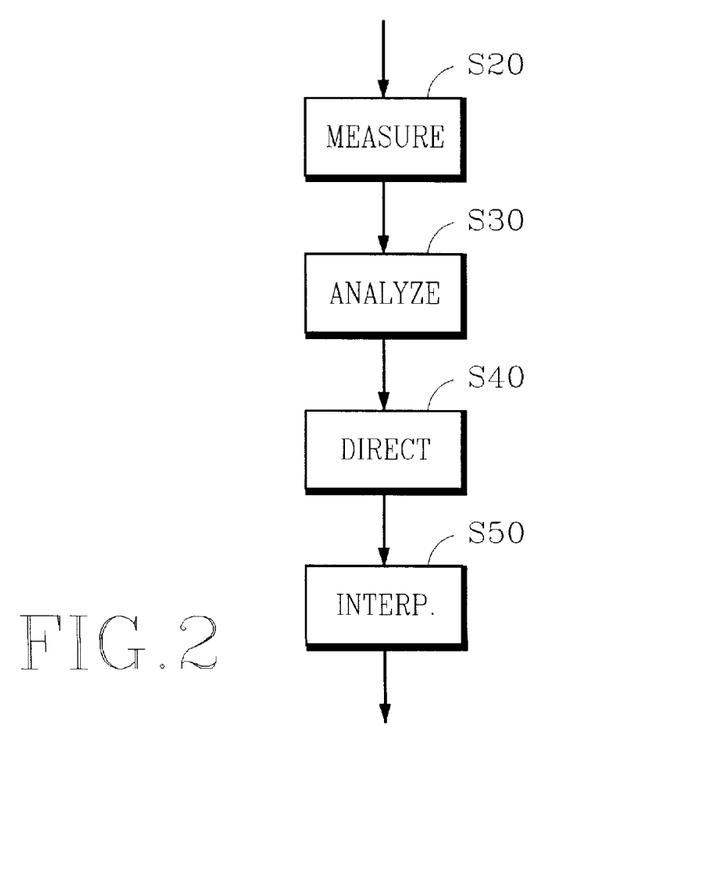
FIG. 2 is a flowchart illustrating principal steps of a method that may be practiced according to the present invention.

FIG. 2 is a flowchart that illustrates principal steps of a method for generating the additional pixels for the image illustrated in FIG. 1. In this method, measure S20 generates a measurement signal that represents a measure of variance between sets of one or more pixels in a respective pair of sets. Typically, the measurement represents differences in brightness or gray-scale values of pixels. For color images, the measurement may represent differences in levels of composite colors such as red, green and blue (RGB) in so called RGB images. The techniques herein may be applied to representations of brightness, or luminance, as well as to representations of composite color levels.

Referring to FIG. 1, set 111 and set 211 form a respective pair of sets in which set 111 contains a single pixel 103 and set 211 contains a single pixel 207. Set 112 and set 212 form another pair of sets in which set 112 contains pixels 107 through 109 and set 212 contains pixels 201 through 203. A respective set may contain pixels in more than one row of the image. It is anticipated that embodiments of the present invention will generate measurement signals for pairs of sets in which all sets contain the same number of pixels; however, this limitation is not required to practice the invention.

Each set of pixels has a reference point. The two reference points for a pair of sets are on opposite sides of the location for additional pixel 305 to be generated and they define a line that passes through the location for additional pixel 305, or substantially passes through this location. Throughout this disclosure, reference is made to various points, locations, lines and the like that "substantially" conform to a stated condition. Some variance is acknowledged because, for example, an image may comprise pixels arranged in rows and columns that are not orthogonal or the distance between adjacent pixels may vary throughout the image.

In the example shown in FIG. 1, set 111 has a reference point at the center of pixel 103 and set 211 has a reference point at the center of pixel 207. These two reference points define line 311 that forms an acute angle with reference vector 300. Reference vector 300 originates at the location for additional pixel 305 and is substantially orthogonal to and intersects the rows of pixels. The acute angle between line 311 and reference vector 300 is in a first quadrant that is defined by reference vector 300 and base line 310. Base line 300 is orthogonal to reference vector 300 and passes through the location for additional pixel 305. In this example, the first quadrant is above base line 310 and to the left of reference vector 300.

Set 212 has a reference point at the center of pixel 202 and set 112 has a reference point at the center of pixel 108. These two reference points define line 312 that forms an acute angle with reference vector 300 in a second quadrant that is defined by reference vector 300 and base line 310 and is on a side of reference vector 300 that is opposite the first quadrant. In this example, the second quadrant is above base line 310 and to the right of reference vector 300.

Step S20 generates a measurement signal for a pair of sets by applying a function $f$ to the pixels in that pair of sets to evaluate the amount of variance of pixels between the two sets. Each measurement signal conveys a measure of variance and an indication of the direction along which the variance was measured. In one embodiment, the function $f$ takes the sum of the absolute differences between respective pixels in the two sets of a respective pair of sets. For example, a measurement of variance between pixels along line 311 could be obtained from the pixels in sets 111 and 211 by calculating:

$$V_{311}=f(p_{103}, p_{207})=|p_{103}-p_{207}| \quad (1)$$

where $V_{311}$=measurement of variance along line 311, $p_{103}$=the brightness and/or color level of pixel 103, and $p_{207}$=the brightness and/or color level of pixel 207.

A measurement of variance along line 312 can be obtained from the pixels in sets 212 and 112 by calculating:

$$V_{312}=f(s_{112}, s_{212})=|p_{107}-p_{201}|+|p_{108}-p_{202}|+|p_{109}-p_{203}| \quad (2a)$$

where $s_{112}$=pixel set 112=$\{p_{107}, p_{108}, p_{109}\}$, and $s_{212}$=pixel set 212=$\{p_{201}, p_{202}, p_{203}\}$.

In this example, differences are taken between pixels that have the same relative positions within their respective sets. Alternatively, differences may be taken between pixels that have inverse or mirrored relative positions with their respective sets. For example, a measure of variance could be obtained from:

$$V_{312}=f(s_{112}, s_{212})=|p_{107}-p_{203}|+|p_{108}-p_{202}|+|p_{109}-p_{201}| \quad (2b)$$

A measurement of variance between sets of pixels could be obtained by calculating products of normalized pixel values. For example:

$$V_{312}=f(s_{112}, s_{112})=(P_{107}*P_{201})+(P_{108}*P_{202})+(P_{109}*P_{203}) \quad (2c)$$

where $P_m$=denotes a normalized brightness and/or color level of pixel m.

The pixels may be normalized in any convenient manner. One way in which pixel values may be normalized is by subtracting from each pixel's value the average of all pixels within a respective pair of sets, e.g., $P_{107}=p_{107}-(p_{107}+p_{108}+p_{109}+p_{201}+p_{202}+p_{203})/6$. The values could also be scaled according to the dynamic range of values within a pair of sets. The value calculated by this measurement function varies inversely with the degree of variance. A small value indicates a high degree of variance and a large value indicates a low degree of variance.

Many other measurement functions are possible. No particular measurement function $f$ is critical to the practice of the present invention.

Referring again to FIG. 2, analyze step S30 analyzes the measurement signals generated in step S20 to select two directions of low variance about the location for additional pixel 305, to selected a single best direction for interpolation from these two directions, and to derive a measure of ambiguity for that selected single best direction. For example, a high degree of ambiguity will exist if the two directions of low variance represent equal levels of low variance along the two directions forming equal acute angles with reference vector 300 in different quadrants. Several tests for ambiguity are discussed in more detail below. In some embodiments, step S30 may also evaluate the selected measurement signal to derive a measure of confidence in the selected single best direction. Several tests for confidence are also discussed below.

Direct step S40 derives an interpolation direction in response to the selected single best direction, the measure of ambiguity and the measure of confidence in the selected direction. To the extent the measure of ambiguity is high or the measure of confidence is low, the interpolation direction tends toward a direction collinear with reference vector 300. In one embodiment, the interpolation direction is formed from a weighted combination of the selected direction and a direction along reference vector 300, where the weights in the combination are varied according to the measures of ambiguity and confidence.

Interpolate step S50 generates additional pixel 305 by interpolating pixels located along or near the derived interpolation direction. In one embodiment, the number of pixels that are included in the interpolated is the same as the number of pixels in a respective pair of sets of pixels used to generate the measurement signals; however, essentially any number of pixels may be interpolated.

This method is repeated for each of the additional pixels to be generated.

B. Device

Figure 3:
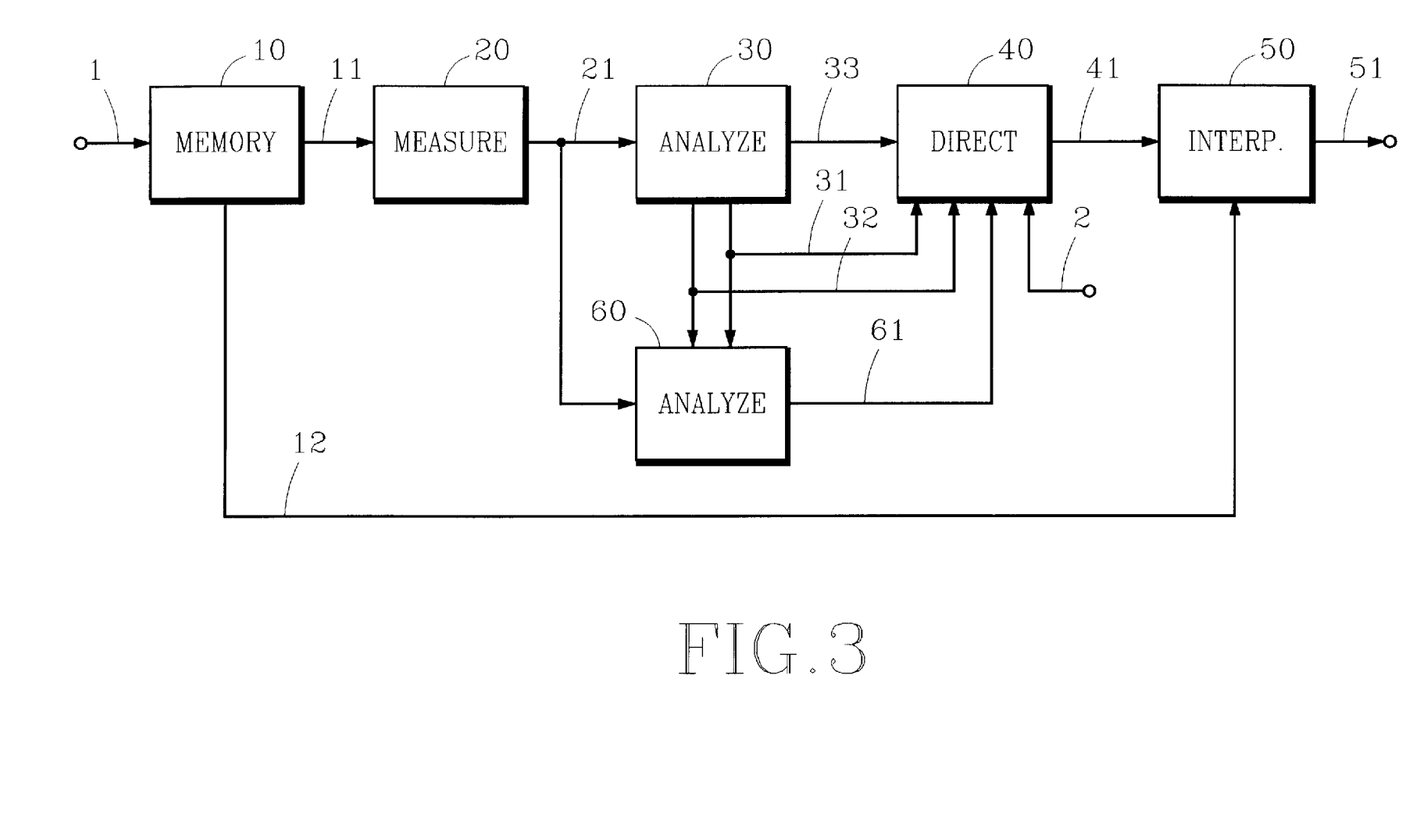
FIG. 3 is a functional block diagram illustrating principal components of one embodiment of a device according to the present invention.

FIG. 3 illustrates the principal components of one embodiment of a device according to the present invention. Memory 10 stores information representing pixels of an image conveyed by a signal received from path 1. The pixel representations stored in memory 10 may be identical to the representations used to generate the image for display, or they may result from filtering or other types of pre-processing to facilitate resolution enhancement. Measure 20 generates measurement signals 21 by applying a measurement function $f$ to pixel information 11 obtained memory 10. Analyze 30 analyzes measurement signals 21 as discussed above, identifies a first measurement signal 31 and a second measurement signal 32, selects a direction corresponding to one of these two measurement signals, and generates a first control signal 33 that represents a measure of ambiguity. Analyze 60 analyzes the selected direction and generates a second control signal 61 that represents a measure of confidence in the selected direction. Direct 40 derives an interpolation direction in response to the selected direction, the first control signal 33, the second control signal 61, and a signal 2 representing a direction substantially collinear with reference vector 300, and generates interpolation direction signal 41. In response to interpolation direction signal 41, interpolate 50 generates signal 51 representing additional pixel 305 by interpolating pixels located along or near the derived interpolation direction.

1. Memory

Memory 10 may be implemented in a wide variety of ways. For example, memory 10 may comprise two line-buffer circuits commonly used in devices such as television line doublers. As another example, memory 10 may comprise random access memory in a computer system that is large enough to hold pixel information for an entire image at one time. Although the choice of memory architecture may have significant effects on device performance and cost, no particular implementation in concept is critical to the practice of the present invention.

2. Measurement Circuit

Measure 20 generates a plurality of measurement signals 21 that represent measures of variance between sets of pixels. These measurement signals convey a measure of variance as well as an indication of the direction along which the variance was measured.

Figure 5:
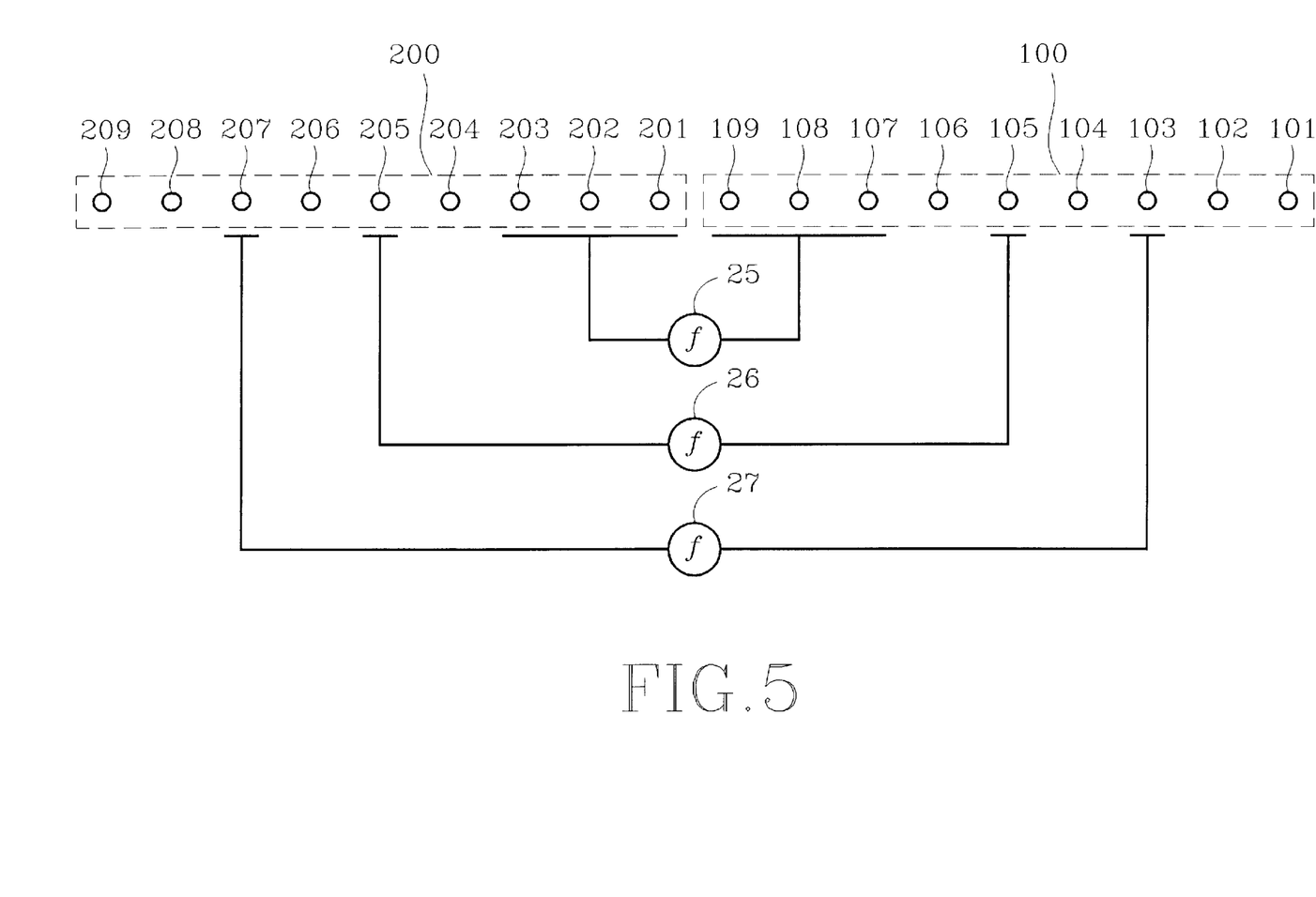
FIG. 5 is a hypothetical schematic representation of a measurement function applied to representations of pixels stored in memory.

FIG. 5 is a hypothetical schematic representation of a measurement function $f$ applied to representations of pixels stored in memory 10. As explained above, the measurement function is typically applied to values that represent a brightness and/or color level of each pixel.

A portion 100 of memory 10 stores representations of pixels 101 through 109 and a portion 200 of memory 10 stores representations of pixels 201 through 209. As shown in the figure, function 25 is applied to generate a measure of variance between the pixels contained in set 212 and set 112, and function 27 is applied to generate a measure of variance between the pixels contained in set 111 and set 211. Function 26 is applied to generate a measure of variance between pixels 105 and 205 which have centers that are along a line that is collinear or substantially collinear with reference vector 300; however, some implementations of the present invention do not need to generate a measurement signal for these pixels.

If the measurement function $f$ obtains the absolute value of a difference, function 27 generates a measurement of variance for single-pixel sets according to expression 1 shown above. A measurement function may be applied to sets of plural pixels in a variety of ways. If measurement function $f$ obtains the sum of absolute values of differences, function 25 may generate a measurement of variance for sets 212 and 112 according to either expression 2a or 2b shown above, for example.

A wide variety of measurement functions may be used. For example, measurement function $f$ may calculate the square of differences between respective pixels and/or it may weight pixels or pixel differences according to some function to obtain a form of correction such as gamma correction. It is anticipated that embodiments of the present invention will use the same measurement function for all pairs of sets of pixels; however, this limitation is not required to practice the present invention. For example, measurement function $f$ could vary as a function of angle or reference point displacement, discussed below.

3. First Analysis Circuit

Analyze 30 represents a first analysis circuit that analyzes measurement signals 21 received from measure 20, selects a "best" direction for possible interpolation from among the directions represented by measurement signals 21, and derives a measure of ambiguity for interpolation about the location at which an additional pixel is to be generated. Several examples of such analysis are described below and may be used in essentially any combination. Other forms of analysis may be used in lieu of or in addition to those described below without departing from the scope of the present invention.

Figure 4:
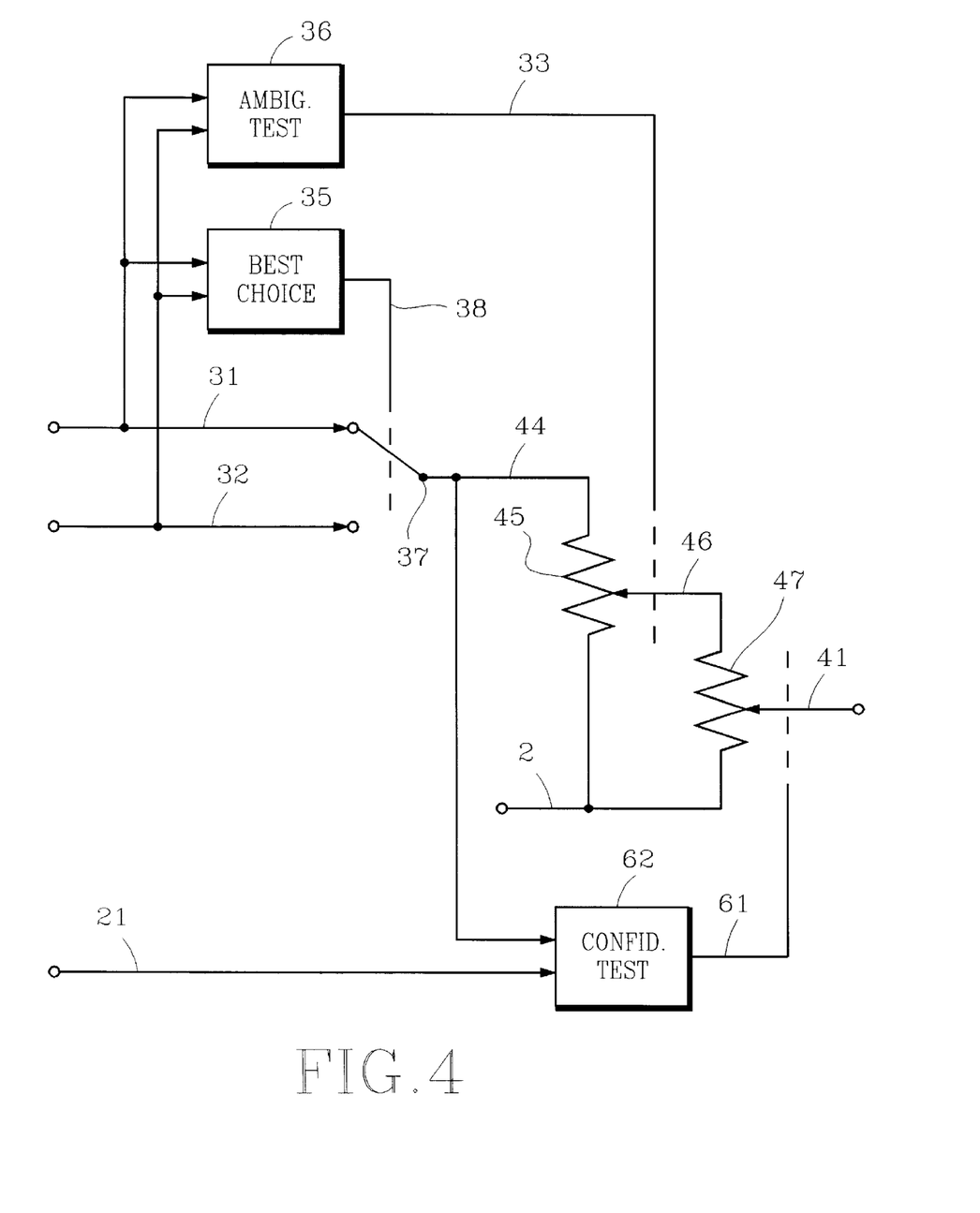
FIG. 4 is a schematic representation of principal components in a device according to the present invention for analyzing measurement signals and deriving an interpolation direction.

FIG. 4 is a schematic representation of one embodiment that includes portions of a first analysis circuit. In this embodiment, the first analysis circuit comprises best choice 35, ambiguity test 36 and switch 37.

a. Best Choice Selection

Path 31 receives a first measurement signal representing a minimum of the measurement function $f$ that corresponds to a pair of sets having reference points defining a line forming an acute angle with reference vector 300 in the first quadrant. For ease of discussion, such a condition is referred to simply as a minimum in the first quadrant. Preferably, if more than one measurement signal represents a minimum in the first quadrant, the measurement signal representing a minimum with the smallest acute angle in the first quadrant is selected as the first measurement signal. Similarly, path 32 receives a second measurement signal representing a minimum in the second quadrant. Preferably, if more than one measurement signal represents a minimum in the second quadrant, the measurement signal representing a minimum with the smallest acute angle in the second quadrant is selected as the second measurement signal.

In one embodiment, measurement function $f$ is applied to generate a measurement signal for a pair of sets of pixels that have reference points along a line that is collinear or substantially collinear with reference vector 300. If this measurement signal represents a minimum, it could be selected as the first measurement signal and the second measurement signal.

Best choice 35 analyzes the first and second measurement signals and generates a signal along path 38 controlling switch 37 to select the measurement signal representing the better choice of interpolation directions. If the first measurement signal is chosen, for example, interpolation along a line forming an acute angle in the first quadrant is deemed to be better than interpolation along a line forming an acute angle in the second quadrant.

In one embodiment, best choice 35 derives a metric for the first and second measurement signals and selects the measurement signal having the smaller metric. The metric is smaller for measurement signals representing minimums that correspond to smaller variations in pixels along lines forming smaller angles with reference vector 300. In other words, best choice 35 chooses measurement signals that represent either deep minimums or small angles, preferably both. This preference can be implemented by the following:

$$X_i = |\Delta_i| * \min f_i \quad (3)$$

where $X_i$=metric for the measurement signal in quadrant i,
$\Delta_i$=displacement of corresponding set reference point relative to reference vector 300, and
$\min f_i$=minimum of measurement function $f$ in quadrant i.

In this embodiment, pixels in each row are separated from one another by a substantially constant interval d and the displacement is expressed in terms of this interval. Referring to FIG. 1, for example, the displacement $\Delta_i$ for the measurement signal corresponding to sets 111 and 211 is equal to the displacement between pixel 103 and reference vector 300, or $-2d$. The displacement $\Delta_i$ for the measurement signal corresponding to sets 212 and 112 is equal to the displacement between pixel 108 and reference vector 300, or $+3d$. If we assume these two measurement signals represent minima of measurement function $f$ that are both equal to 50, for example, the metric for the first measurement signal would be $X_1 = |-2d| * 50 = 100d$ and the metric for the second measurement signal would be $X_2 = |3d| * 50 = 150d$. For simplicity, the factor d can be dropped from the metric. In this example, best choice 35 would generate a signal causing switch 37 to select the first measurement signal which is passed along path 44.

Figure 6A:
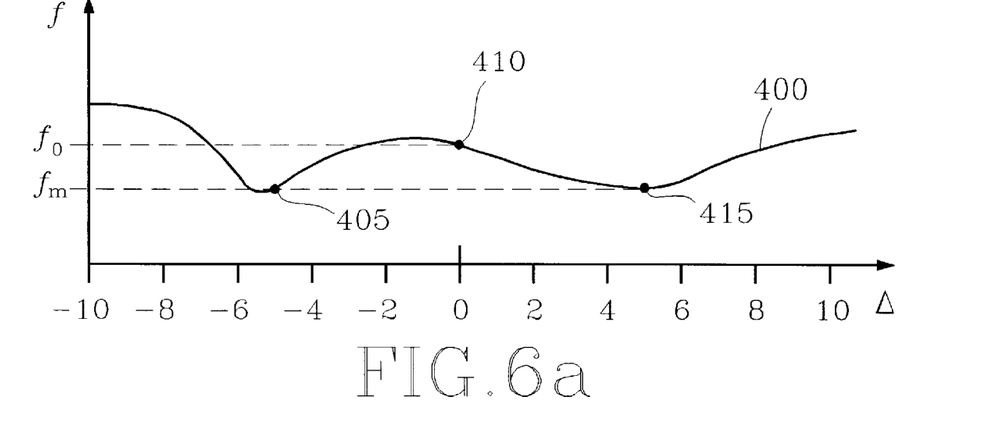
FIGS. 6a to 6c are graphical representations of a hypothetical measurement function plotted as a function of displacement.

Curve 400 in the graph of FIG. 6a represents a hypothetical measurement function $f$ plotted as a function of displacement $\Delta$. In this and other figures, measurement function $f$ is represented as a continuous function of displacement $\Delta$ for ease of illustration; however, because of the nature of pixelized images, it will be appreciated that function $f$ is discrete. Point 405 represents a minimum in the first quadrant and point 415 represents a minimum in the second quadrant. Point 410 represents the value of function $f$ for a pair of sets having reference points that are collinear or substantially collinear with reference vector 300. The minima at points 405 and 415 have equal magnitudes $f_m$ and occur at "equal" displacements, i.e., the absolute values of the two displacements are equal. In this example, the metric $X_1$ for the minimum at point 405 is equal to the metric $X_2$ for the minimum at point 415; therefore, best choice 35 could select either minimum as representing the preferred direction. The equality of the metrics does not reduce the desirability of either minimum but it does indicate high degree of ambiguity that is handled in a manner discussed below.

b. Ambiguity Tests

Ambiguity test 36 analyzes the first and second measurement signals and generates a first control signal along path 33 controlling variable divider 45 generates a signal on path 46 representing a direction that is a weighted combination of the directions represented by the measurement signal present on path 44 and a signal received from path 2. The signal received from path 2 represents a direction collinear, or substantially collinear, with reference vector 300. The weighted combination is formed in response to first control signal 33. If first control signal 33 represents a high level of ambiguity, divider 45 generates a signal on path 46 representing a direction that is essentially equal to the direction represented by the signal received from path 2. If first control signal 33 represents a very low level of ambiguity, divider 45 generates a signal on path 46 representing a direction that is essentially equal to the direction represented by the measurement signal present on path 44.

In one embodiment, ambiguity test 36 generates first control signal 33 in response to the absolute value of the difference between the two metrics discussed above, or $$\alpha = |X_1 - X_2|. \quad (4a)$$

In other words, if the first and second measurement signals have equal metrics, i.e., they represent equally good directions of interpolation, a very high degree of ambiguity exists. An example of this situation is illustrated in FIG. 6a.

Figure 6B:
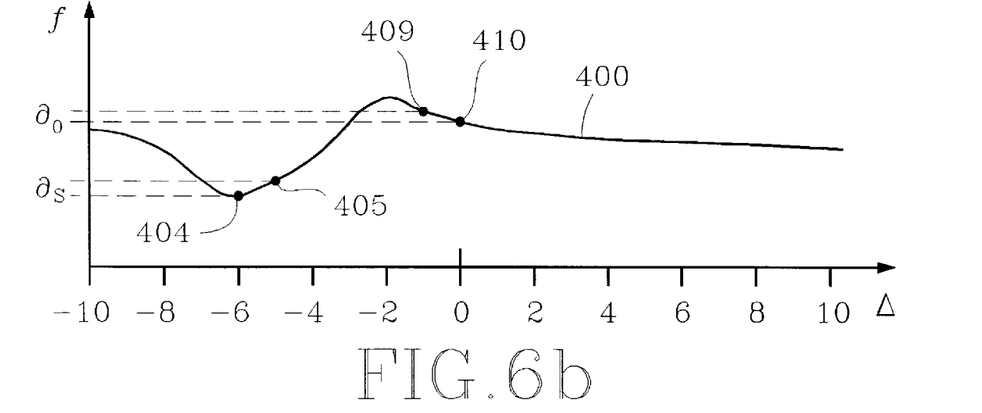

An example in which ambiguity is very low is illustrated in FIG. 6b. This example is discussed further below in connection with confidence tests.

In an alternative embodiment, the function of best choice 35 may be combined with the function of ambiguity test 36 by modifying the structure of divider 45 and having ambiguity test 36 generate first control signal 33 in response to the difference $$\alpha = (X_1 - X_2). \quad (4b)$$

Divider 45 is modified to couple between signal paths 31 and 32, and to have a center tap coupled to signal path 2. The wiper moves along the divider in response to a control signal such that it moves towards the end coupled to path 31 for negative control signals, moves toward the other end coupled to path 32 for positive signals, and moves toward the center tap as the control signal moves toward zero. Best choice 35 may be omitted in this embodiment because the polarity of the control signal, as determined by the difference in expression 4b, indicates whether the first measurement signal or the second measurement signal represents the preferred direction.

In another embodiment, minima of measurement function $f$ are excluded from consideration if they exceed a magnitude threshold. Preferably, the magnitude threshold is high for small angles or, alternatively, for small absolute values of displacement, and is low for large angles or displacements.

Another test for ambiguity comprises the absolute value of the difference between two products, as follows:

$$\alpha = |(\min f_1 * |\Delta_1|) - (\min f_2 * |\Delta_2|)|. \quad (5)$$

Preferably, first control signal 33 is generated in response to a measure of ambiguity $\alpha$ relative to two thresholds $T_A$ and $T_U$. For values of $\alpha$ that are below threshold $T_A$, first control 33 is generated to indicate complete ambiguity. For values of $\alpha$ that are above threshold $T_U$, first control signal is generated to represent complete lack of ambiguity. For values of $\alpha$ that are between the two thresholds, first control signal 33 is generated to indicate a corresponding degree of ambiguity.

Yet another test for ambiguity comprises testing for two small angles by determining whether:

$$\|\Delta_1|+|\Delta_2\|<T_d.+tm \quad (6)$$

If the sum is less than the threshold $T_d$, the two minima are sufficiently close to reference vector 300 to declare an ambiguity.

4. Second Analysis Circuit

Analyze 60 represents a second analysis circuit that analyzes measurement signals to derive a measure of confidence in the direction selected by analyze 30. Several examples of such analysis are described below and may be used in essentially any combination. Other forms of analysis may be used in lieu of or in addition to those described below without departing from the scope of the present invention.

FIG. 4 is a schematic representation of one embodiment that includes portions of a second analysis circuit. In this embodiment, the second analysis circuit comprises confidence test 62.

Confidence test 62 receives a selected measurement signal from switch 37 via path 44 and receives one or more measurement signals from path 21. In response to these signals, confidence test 62 generates second control signal 61 representing a measure of confidence in the selected direction received from path 44. Second control signal 61 controls variable divider 47 to form a weighted combination of the directions represented by the signal present on path 46 and the signal received from path 2, described above. If second control signal 61 represents a low level of confidence, divider 47 generates second control signal 61 representing a direction that is essentially equal to the direction represented by the signal received from path 2. If second control signal 61 represents a very high level of confidence, divider 47 generated second control signal 61 representing a direction that is essentially equal to the direction represented by the measurement signal present on path 46.

a. "Same-Slope-Direction" Confidence Test

According to one level-of-confidence test, confidence test 62 analyzes the magnitude of the measurement function $f$ as a function of displacement $\Delta$ to derive measures of change in magnitude at two different displacements; one measure of change $@_S$ is derived at displacement $\Delta_S=S$ for the selected measurement signal and a second measure of change $@_0$ is derived at displacement $\Delta_0=0$ for the measurement signal corresponding to the pair of sets having reference points defining a line that is collinear or substantially collinear with reference vector 300. The measures of change are analogous to a slope or first derivative of the measurement function and can be calculated from the difference between values of the measurement function at adjacent displacements, or $$@_S=f_{[S-1]}-f_S \quad (7)$$

where
$f_S$=value of the measurement function at displacement $\Delta_S=S$, and
$f_{[S-1]}$=value of the measurement function at displacement $[S-1]$.

The notation $[S-1]$ represents the displacement that, relative to displacement S, is one unit closer to reference vector 300. This may be expressed as $[S-1]=\text{sgn}(S)*(|S|-1)$, where sgn(S) has a magnitude equal to one and has the same sign as S. Similarly, the measure of change at displacement $\Delta_0$ is $@_0=f_0-f_{-1}$. Various embodiments of the present invention may derive measures of change for essentially any convenient displacement.

An example of these measures of change is illustrated in FIG. 6b. Curve 400 represents a hypothetical measurement function $f$ plotted as a function of displacement $\Delta$. Point 404 represents a minimum $f_S$ in the first quadrant and point 405 represents the magnitude of the measurement function $f_{[S-1]}$ for an adjacent displacement. The measure of change derived for displacement $\Delta_S$ is represented by the interval $@_S$. Point 410 represents the value of function $f_0$ for a pair of sets having reference points that are collinear or substantially collinear with reference vector 300. Point 409 represents the magnitude of the measurement function $f_{-1}$ for an adjacent displacement. The measure of change derived for displacement $\Delta_0$ is represented by the interval $@_0$.

A measure of confidence $\beta$ is derived from a difference between the two measures of change, or:

$$\beta=|@_S-@_0| \quad (8)$$

where the level of confidence varies inversely with the measure $\beta$.

In the example shown in FIG. 6b, the slope or measure of change $@_S$ at point 404 is not in the same direction as the slope or measure of change $@_0$ at point 410. The measure $\beta$ calculated from the difference of these two measures of change is large; therefore, the level of confidence is low. Stated differently, the level of confidence in the potential interpolation direction corresponding to the minimum at point 404 is low because a maximum of the function $f$ exists between points 404 and 410; i.e., if the graphical representation of measurement function $f$ were envisioned as representing a cross-section of terrain, then it could be said that the two points are not "on the same side of the hill."

b. "Remote-Transient" Confidence Test

According to another level-of-confidence test, confidence test 62 compares a measure of change $@_S$ in function $f$ at a minimum with a threshold $T_t(\Delta)$. The measure of change may be derived in essentially manner including those described above. Threshold $T_t(\Delta)$ decreases for increasing values of absolute displacement $|\Delta|$ and is normalized according to the peak-to-peak value or dynamic range of the measurement function across the domain of measurement. This confidence test checks for the occurrence of rapid changes in the measurement function $f$ at large displacements.

The level of confidence in a potential direction of interpolation is very high for measures of change that do not exceed the threshold. The level of confidence is reduced to the extent the measure of change $@_S$ exceeds the threshold. This measure of confidence $\beta$ may be expressed as:

$$\beta=@_S-T_t(\Delta) \text{ for } @_S>T_t(\Delta), \text{ and} \quad (9a)$$

$$\beta=0 \text{ otherwise.} \quad (9a)$$

where the level of confidence varies inversely with the measure $\beta$.

Figure 6C:
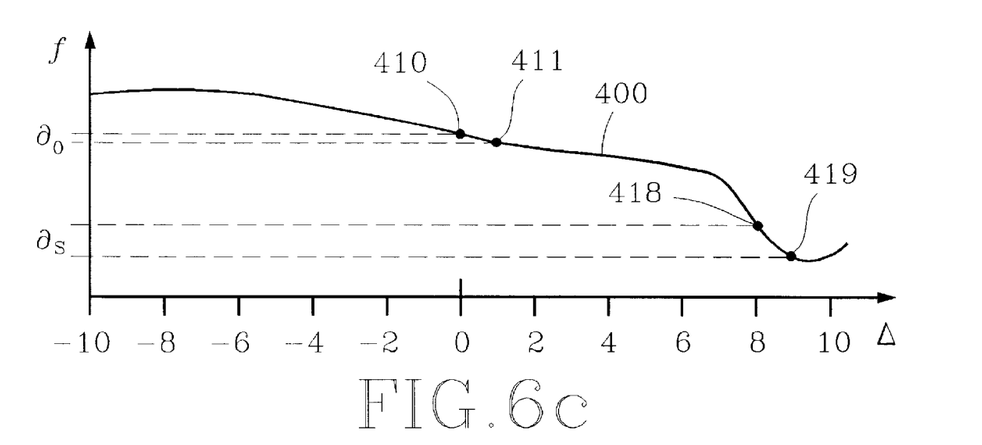

In the example shown in FIG. 6c, the slope or measure of change $@_S$ at point 419 is in the same direction as the slope or measure of change $@_S$ at point 410. According to the first "same-slope-direction" confidence test described above, points 410 and 419 are on the same side of the hill, so to speak; therefore, the first confidence text might indicate a high level of confidence in this situation. According to this second "remote-transient" confidence test, however, a high value of β would be generated for point 419, indicating a low level of confidence. This second test detects situations in which a minimum is likely to result from noise or a transient in an image that does not represent a valid diagonal direction for interpolation.

5. Direction Circuit

Direct 40 represents a direction circuit that generates interpolation direction signal 41 according to weighted combinations of various direction signals. Generally, in situations where first control signal 33 indicates high levels of ambiguity and/or second control signal 61 indicates low levels of confidence in a selected direction, direct 40 generates an interpolation direction signal that represents a direction equal to or substantially equal to the direction represented by signal 2. Signal 2 represents a direction that is collinear, or substantially collinear, with a reference vector 300.

FIG. 4 is a schematic representation of one embodiment that includes a direction circuit within direct 40. In this embodiment, the direction circuit comprises divider 45 and divider 47. Dividers represent one way in which weighted combinations of signals may be formed and are not essential to the present invention.

Divider 45 generates signal 46 representing a direction that is a weighted combination of directions represented by signal 44 and signal 2. The weighted combination is formed according to first control signal 33. This may be expressed as:

$$D46 = C33 * D44 + (1 - C33) * D2 \tag{10a}$$

where

D46=the direction represented by signal 46,

D44=the direction represented by selected measurement signal 44,

D2=the direction represented by signal 2, and

C33=a factor conveyed by first control signal S33 that varies between zero and one.

In this example, the factor conveyed by first control signal 33, when equal to one, represents total ambiguity and, when equal to zero, represents a total lack of ambiguity.

Similarly, divider 47 generates signal 41 representing a direction that is a weighted combination of directions represented by signal 46 and signal 2 according to second control signal 61, or:

$$D41 = C61 * D46 + (1 - C61) * D2 \tag{10b}$$

where

D41=the direction represented by signal 41, and

C61=a factor conveyed by signal S61 that varies between zero and one.

In this example, the factor conveyed by signal 61, when equal to one, represents complete confidence in the direction represented by signal 46 and, when equal to zero, represents a complete lack of confidence in this direction.

Divider 45 and divider 47 may be replaced by a single divider responsive to first control signal S33 and second control signal S61 as:

**D41=C61*[C33*D44+(1−C33)*D2]+(1−C61)*D2,** which may be rewritten as:

$$D41 = (C61*C33)*D44 + [1-(C61*C33)]*D2 \tag{10c}$$

Referring to FIG. 3, one embodiment of a device according to the present invention omits analyze 60; therefore, direct 40 generates interpolation direction signal 41 without reference to second control signal 61. Referring to the embodiment illustrated in FIG. 4, for example, confidence test 62 and divider 47 are omitted and interpolation direction signal 41 is generated directly from signal 46.

Other forms of weighted combinations may be used. For example, a direction represented by a measurement signal may be weighted by a factor that varies as a cosine of the angle between the direction and reference vector 300. Although the specific form of weighting may have significant effects upon device performance, no particular form is critical in concept to the practice of the present invention.

6. Interpolation Circuit

Interpolate 50 generates a representation for additional pixel 305 by interpolating representations of neighboring pixels that are along a direction represented by interpolation direction signal 41. It is anticipated that linear interpolation will be used but the present invention may be practice with other forms of interpolation. For example, non-linear interpolation may be used to account for non-linearities in a display device. Interpolation may be done between pairs of individual pixels or between pairs of sets of plural pixels. Further, if interpolation is done between sets of plural pixels, the pixels in each set may be weighted differently.

C. Alternatives

The various features and embodiments of the present invention disclosed herein may be practiced in various combinations as will be apparent from the discussion above and from the appended claims:

What is claimed is:

1. A method for increasing the resolution of an image comprising a two-dimensional array of pixels arranged in rows by generating a plurality of additional pixels, wherein for a respective additional pixel generated at a location within said image said method comprises:

generating a plurality of measurement signals, each measurement signal representing a measure of variance between sets of one or more pixels in a respective pair of sets by applying a function to said respective pair of sets, wherein each of said sets has a reference point and the two reference points for a pair of sets are on opposite sides of said location and define a line substantially passing through said location that forms an angle with a reference vector, wherein said reference vector originates at said location and is substantially orthogonal to said rows and intersects said rows, identifying a first measurement signal that represents a first minimum of said function and corresponds to a first pair of sets having reference points that define a first line forming a first acute angle with said reference vector in a first quadrant and identifying a second measurement signal that represents a second minimum of said function and corresponds to a second pair of sets having reference points that define a second line forming a second acute angle with said reference vector in a second quadrant, wherein said first quadrant is on a first side of said reference vector and is defined by said reference vector and a base line passing through said respective location that is orthogonal to said reference vector, and said second quadrant is on a second side of said reference vector opposite said first side and is defined by said reference vector and said base line, and analyzing said first measurement signal and said second measurement signal and in response thereto generating a first control signal indicating a measure of an ambiguousness for interpolation about said location in said image, generating a direction control signal in response to a weighted combination of directions corresponding to said reference vector, said first line and said second line, wherein said weighted combination is formed in response to said first control signal, and generating said additional pixel at said location by interpolating pixels within a pair of sets on either side of said location having reference points along an interpolation direction according to said direction control signal.

2. A method according to claim 1 wherein each of said sets of pixels is composed of one pixel.

3. A method according to claim 1 wherein each of said sets of pixels comprises pixels in a plurality of rows.

4. A method according to claim 1 wherein each of said sets of pixels comprises a plurality of pixels and has a center pixel at a respective reference point, and wherein said brightness values correspond to the center pixels of respective sets.

5. A method according to claim 1 wherein said first and second measurement signals represent minima of said function that are also less than a threshold which decreases with increasing distance between reference points of each set in a respective pair of sets of pixels.

6. A method according to claim 1 wherein said first and second measurement signals represent minima of said function corresponding to pairs of sets having reference points defining lines forming the smallest acute angle with said reference vector in said first quadrant and said second quadrant.

7. A method according to claim 1 wherein said function is a sum of absolute differences between respective pixels in each set of a respective pair of sets of pixels.

8. A method according to claim 1 wherein said function is a sum of products of respective normalized pixel values in each set of a respective pair of sets of pixels.

9. A method according to claim 1 wherein said two-dimensional array of pixels is also arranged in columns, and said plurality of additional pixels form an additional row of pixels in said image such that said additional pixels are also arranged in said columns.

10. A method according to claim 1 wherein said first control signal is generated such that said interpolation direction is substantially collinear with said reference vector if the absolute value of a difference between said first minimum and said second minimum is less than a magnitude threshold and the absolute value of a difference between said first acute angle and said second acute angle is less than an angular threshold.

11. A method according to claim 10 wherein said magnitude threshold is variable and is larger for small values of said first and said second acute angles.

12. A method according to claim 1 wherein a third measurement signal is generated by applying said function to a pair of sets of pixels having reference points along a line substantially collinear with said reference direction, wherein said method further comprises:

calculating a first measure of change between said first measurement signal and another of said measurement signals, and calculating a third measure of change between said third measurement signal and another of said measurement signals, and generating a second control signal indicating a measure of confidence in an interpolation direction corresponding to said first minimum, wherein said measure of confidence varies inversely with the absolute value of a difference between said first measure of change and said third measure of change, wherein said weighted combination is formed in response to said first control signal and said second control signal.

13. A device for increasing the resolution of an image comprising a two-dimensional array of pixels arranged in rows by generating a plurality of additional pixels, a respective additional pixel generated at a location within said image, said device comprising:

an input terminal receiving an input signal representing pixels within said image, memory circuits coupled to said input terminal so as to store representations of pixels in a plurality of rows of said image, a measurement circuit coupled to said memory circuits so as to generate a plurality of measurement signals, each measurement signal corresponding to a respective displacement and representing a measure of variance between sets of one or more pixels in a respective pair of sets, each set in said respective pair of sets centered about a point on either side of said location, each of said points displaced from said location along said rows by a distance equal to said respective displacement, a first analysis circuit coupled to said measurement circuit so as to select from said plurality of measurement signals a selected measurement signal representing a minimum measure of variance and to generate a first control signal indicating a measure of ambiguousness for interpolation in said image about said location, a direction circuit coupled to said first analysis circuit so as to generate a direction control signal representing a variable combination of a signal representing a vertical direction and a selected direction signal representing the respective displacement corresponding to said selected measurement signal, said variable combination varied according to said first control signal, and an interpolation circuit coupled to said memory circuits and to said direction circuit so as to generate a value for said respective additional pixel by interpolating representations of pixels stored in memory circuits along an interpolation direction determined in response to said direction control signal.

14. A device according to claim 13 wherein each of said sets of pixels is composed of one pixel.

15. A device according to claim 13 wherein each of said sets of pixels comprises pixels in a plurality of rows.

16. A device according to claim 13 wherein said measurement circuit generates said measurement signals in response to sums of absolute differences between respective pixels in each set of a respective pair of sets of pixels.

17. A device according to claim 13 wherein said measurement circuit generates said measurement signals in response to sums of products of respective normalized pixel values in each set of a respective pair of sets of pixels.

18. A device according to claim 13 wherein said first analysis circuit comprises a selection circuit coupled to said measurement circuit and a calculation circuit coupled to said measurement circuit, wherein said selection circuit selects said selected measurement signal from said plurality of measurement signals according to magnitude and corresponding displacement of said measurement signals, and said calculation circuit generates said first control signal according to magnitude and corresponding displacement of said measurement signals.

19. A device according to claim 13 wherein said first analysis circuit selects said selected measurement signal corresponding to the smallest respective displacement for all of said measurement signals representing a minimum measure of variance.

20. A device according to claim 13 wherein said direction circuit comprises a divider circuit coupled to said signal representing a vertical direction and to said selected direction signal, wherein said divider circuit provides a division that is adapted in response to said first control signal.

21. A device according to claim 13 that further comprises a second analysis circuit coupled to said measuring circuit and to said first analysis circuit so as to generate a second control signal indicating a measure of confidence in an interpolation direction in said image about said location corresponding to said selected direction signal, wherein said direction circuit is also coupled to said second analysis circuit so that said variable combination is also varied according to said second control signal.

22. A device according to claim 13 wherein said direction circuit comprises a first divider circuit coupled to said signal representing a vertical direction and to said selected direction signal and having an output, and a second divider circuit coupled to a signal representing said vertical direction and to the output of said first divider circuit, wherein said first divider circuit provides a division that is adapted in response to said first control signal and said second divider circuit provides a division that is adapted in response to said second control signal.

23. A method for increasing the resolution of an image comprising a two-dimensional array of pixels arranged in rows by generating a plurality of additional pixels, wherein for a respective additional pixel generated at a location within said image said method comprises:
generating a plurality of measurement signals, each measurement signal representing a respective direction and a respective measure of variance between sets of pixels in said respective direction relative to said location,
evaluating respective directions represented by said measurement signals to identify two best directions for interpolations and selecting therefrom a single best choice direction for interpolation, and evaluating said two best directions and, in response thereto, generating a first control signal indicating a measure of ambiguity for interpolation about said location along said single best choice direction,
generating a direction control signal representing a weighted combination of said single best choice direction and a reference direction that is substantially orthogonal to said rows, wherein said weighted combination is formed according to said first control signal, and
generating said additional pixel by interpolating pixels in said image along a direction represented by said direction control signal.

24. A method according to claim 23 wherein each of said sets of pixels is composed of one pixel.

25. A method according to claim 23 wherein each of said sets of pixels comprises pixels in a plurality of rows.

26. A method according to claim 23 wherein said measure of variance is determined according to a function that is a sum of products of respective normalized pixel values in said sets of pixels.

27. A method according to claim 23 wherein said two best directions for interpolation correspond to respective measurement signals that represent minimums of said variations that are less than a threshold which decreases with increasing distance between sets in a respective pair of sets of pixels.

28. A method according to claim 23 wherein said two best directions for interpolation correspond to respective measurement signals that represent minimums of said variations and correspond to directions that are most nearly collinear with said reference direction.

29. A method according to claim 23 that further comprises evaluating said single best choice direction and, in response thereto, generating a second control signal indicating a measure of confidence in said single best choice direction, wherein said weighted combination is formed according to said first control signal and said second control signal.

30. A method according to claim 29 that comprises analyzing said measurement signals to determine measures of change in said measure of variance as a function of direction and comparing said measures of change with a threshold, said threshold varying as a function of direction that increases for directions that are more orthogonal to said rows, wherein said second control signal is generated to indicate a high measure of confidence in said single best choice direction for said measures of change that do not exceed said threshold.

31. A device for increasing the resolution of an image comprising a two-dimensional array of pixels arranged in rows by generating a plurality of additional pixels, wherein for a respective additional pixel generated at a location within said image, said device comprises:
means for generating a plurality of measurement signals, each measurement signal representing a respective direction and a respective measure of variance between sets of pixels in said respective direction relative to said location,
means for evaluating respective directions represented by said measurement signals to identify two best directions for interpolations and selecting therefrom a single best choice direction for interpolation, and for evaluating said two best directions and, in response thereto, generating a first control signal indicating a measure of ambiguity for interpolation about said location along said single best choice direction,
means for generating a direction control signal representing a weighted combination of said single best choice direction and a reference direction that is substantially orthogonal to said rows, wherein said weighted combination is formed according to said first control signal, and
means for generating said additional pixel by interpolating pixels in said image along a direction represented by said direction control signal.

32. A device according to claim 31 wherein each of said sets of pixels is composed of one pixel.

33. A device according to claim 31 wherein each of said sets of pixels comprises pixels in a plurality of rows.

34. A device according to claim 31 wherein said two best directions for interpolation correspond to respective measurement signals that represent minimums of said variations than are less than a threshold which decreases with increasing distance between sets in a respective pair of sets of pixels.

35. A method according to claim 31 wherein said means for generating measurement signals generates each of said measurement signals representing a respective measure of variance determined according to a function that is a sum of products of respective normalized pixel values in said sets of pixels.

36. A device according to claim 31 wherein said means for evaluating identifies said two best directions as those directions on either side of said reference direction that correspond to minima of said measure of variance and are most nearly collinear with said reference direction.

37. A device according to claim 31 that further comprises means for evaluating said single best choice direction and, in response thereto, generating a second control signal indicating a measure of confidence in said single best choice direction, wherein said weighted combination is formed according to said first control signal and said second control signal.

38. A device according to claim 37 that comprises means for analyzing said measurement signals to determine measures of change in said measure of variance as a function of direction and means for comparing said measures of change with a threshold, said threshold varying as a function of direction that increases for directions that are more orthogonal to said rows, wherein said second control signal is generated to indicate a high measure of confidence in said single best choice direction for said measures of change that do not exceed said threshold.

* * * * *